US010920058B2

(12) United States Patent
Hoefflin et al.

(10) Patent No.: US 10,920,058 B2
(45) Date of Patent: *Feb. 16, 2021

(54) MANUFACTURING PROCESS AND COMPOSITION FOR FOAMED PVC-P ROCK SHIELDS

(71) Applicant: SIKA TECHNOLOGY AG, Baar (CH)

(72) Inventors: Frank Hoefflin, Baden (CH); Herbert Ackermann, Tann (CH); Andreas Brunner, Rafz (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,992

(22) Filed: Oct. 10, 2019

(65) Prior Publication Data

US 2020/0040172 A1 Feb. 6, 2020

Related U.S. Application Data

(63) Continuation of application No. 16/412,736, filed on May 15, 2019, now Pat. No. 10,465,067, which is a
(Continued)

(30) Foreign Application Priority Data

Oct. 1, 2014 (EP) .................................. 14187368

(51) Int. Cl.
*C08L 27/06* (2006.01)
*C08J 9/00* (2006.01)
(Continued)

(52) U.S. Cl.
CPC ........... *C08L 27/06* (2013.01); *B01J 19/0053* (2013.01); *C08J 9/0023* (2013.01); *C08J 9/0066* (2013.01);
(Continued)

(58) Field of Classification Search
CPC .............................. C08J 2201/03; C08L 27/06
See application file for complete search history.

(56) References Cited

U.S. PATENT DOCUMENTS 3,389,446 A * 6/1968 Parrish .................. D03D 15/00
28/165
3,503,907 A * 3/1970 Bonner, Jr. .............. C08J 9/143
521/145
(Continued)

FOREIGN PATENT DOCUMENTS

EP 1065242 A1 1/2001
EP 2612881 A1 7/2013
(Continued)

OTHER PUBLICATIONS

Dec. 14, 2015 International Search Report issued in International Patent Application No. PCT/EP2015/071990.
(Continued)

*Primary Examiner* — Mark S Kaucher
(74) *Attorney, Agent, or Firm* — Oliff PLC

(57) ABSTRACT

A plasticized PVC formulation for foam extrusion including polyvinyl chloride, at least one plasticizer, at least one nucleating agent and a chemical blowing agent, wherein the plasticized PVC formulation is a dry blend containing 0.5 to 5% by weight of one or more nucleating agents and 0.1 to 3% by weight of the chemical blowing agent, wherein the blowing agent is sodium bicarbonate and the nucleating agent is talcum, and a foam extrusion method using said formulation. The extruded plasticized PVC foam is particularly suitable for rock shield pads used for pipeline protection. The foams are lightweight and require less consumption of materials with comparable properties to corresponding solid articles.

29 Claims, 1 Drawing Sheet

Related U.S. Application Data continuation of application No. 15/516,500, filed as application No. PCT/EP2015/071990 on Sep. 24, 2015, now Pat. No. 10,344,157.

(51) Int. Cl.

| | | |
|---|---|---|
| *C08J 9/08* | (2006.01) | |
| *B01J 19/00* | (2006.01) | |
| *C08K 3/26* | (2006.01) | |
| *C08K 5/00* | (2006.01) | |
| *C09J 133/08* | (2006.01) | |

(52) U.S. Cl.
CPC ........ *C08J 9/08* (2013.01); *C08K 3/26* (2013.01); *C08K 5/0016* (2013.01); *C09J 133/08* (2013.01); *B01J 2219/00051* (2013.01); *C08J 2201/03* (2013.01); *C08J 2203/02* (2013.01); *C08J 2327/06* (2013.01); *C08K 2003/265* (2013.01)

(56) References Cited

U.S. PATENT DOCUMENTS

| | | | | |
|---|---|---|---|---|
| 3,766,669 A * | 10/1973 | Pearsall | ................ | A43D 35/00 36/43 |
| 3,812,225 A * | 5/1974 | Hosoda | ................ | C08J 9/06 264/54 |
| 3,837,988 A * | 9/1974 | Hennen et al. | ........ | B32B 27/00 428/92 |
| 3,915,616 A * | 10/1975 | Nackaerts | ............ | B29C 44/507 425/467 |
| 3,944,702 A * | 3/1976 | Clark | .................... | D04H 1/587 442/327 |
| 4,039,486 A * | 8/1977 | Van Der Mark | ...... | C08J 9/0061 521/75 |
| 4,614,671 A * | 9/1986 | Wong | .................. | D06N 3/0002 427/245 |
| 5,456,876 A * | 10/1995 | Redwine | .................. | D04H 3/02 264/555 |
| 5,691,036 A * | 11/1997 | Lin | .......................... | B32B 5/26 428/172 |
| 5,811,186 A * | 9/1998 | Martin | ................ | B24D 11/005 428/373 |
| 5,969,015 A * | 10/1999 | Zinke | .................... | C07F 9/6561 524/109 |
| 5,988,227 A * | 11/1999 | Magoffin | .................. | F16L 1/11 138/105 |
| 6,348,512 B1 * | 2/2002 | Adriani | .................. | C08J 9/0014 521/134 |
| 6,765,033 B1 * | 7/2004 | Sunagawa | ............. | C08J 9/0061 521/134 |
| 2002/0056936 A1 * | 5/2002 | Moran | .................. | C08J 9/0033 264/51 |
| 2003/0224119 A1 * | 12/2003 | Coventry-Saylor | ... | C09J 161/34 427/389.8 |
| 2005/0137341 A1 * | 6/2005 | Hawrylko | ............... | C08L 27/06 525/205 |
| 2006/0264523 A1 * | 11/2006 | Lee | ........................ | B82Y 30/00 521/99 |
| 2007/0048523 A1 * | 3/2007 | Pollet | ...................... | D02G 3/36 428/375 |
| 2008/0099096 A1 * | 5/2008 | Kania | ...................... | D03D 9/00 139/383 R |
| 2012/0208963 A1 * | 8/2012 | Van Rheenen | ........ | C08L 23/286 525/223 |
| 2014/0042706 A1 * | 2/2014 | Pillars | ..................... | D04H 1/42 277/316 |
| 2018/0072879 A1 * | 3/2018 | Young | .................... | C08L 23/14 |

FOREIGN PATENT DOCUMENTS

| | | |
|---|---|---|
| JP | S56-137938 A | 10/1981 |
| RU | 2401847 C2 | 10/2010 |
| WO | 2002/20660 A2 | 3/2002 |

OTHER PUBLICATIONS

Dec. 14, 2015 Written Opinion issued in International Patent Application No. PCT/EP2015/071990.
Mar. 26, 2019 Office Action issued in Russian Patent Application No. 2017108642105.
Feb. 1, 2019 Office Action issued in U.S. Appl. No. 15/516,500.
May 1, 2019 Office Action issued in U.S. Appl. No. 15/516,500.
Jun. 10, 2019 Office Action issued in U.S. Appl. No. 16/412,736.
Jun. 3, 2020 Office Action issued in European Patent Application No. 15 778 226.9.

* cited by examiner

MANUFACTURING PROCESS AND COMPOSITION FOR FOAMED PVC-P ROCK SHIELDS

This application is a Continuation of application Ser. No. 16/412,736, filed May 15, 2019, which is a Continuation of application Ser. No. 15/516,500, filed Apr. 3, 2017 (now U.S. Pat. No. 10,344,157), which is a national stage of PCT/EP2015/071990, filed Sep. 24, 2015, which claims priority to EP 14187368.7, filed Oct. 1, 2014. The entire contents of the prior applications are hereby incorporated by reference in their entireties.

TECHNICAL FIELD

The invention relates to foam extrusion of plasticized PVC (PVC-p).

BACKGROUND OF THE INVENTION

Polyvinyl chloride is one of the most widely used polymers worldwide. The common abbreviation of polyvinyl chloride is PVC which will be used in the following. Depending on the additives used for compounding, the properties of PVC can vary to a large extent. PVC foams are also known. PVC is generally classified into unplasticized or rigid PVC and plasticized or flexible PVC containing plasticizer. The common abbreviations for unplasticized and plasticized PVC are PVC-u and PVC-p, respectively, which are used in the following.

Application areas of flexible PVC are for instance rock shield pads, roofing and waterproofing membranes, waterstops and waterbars, pipes and hosepipes, joint sealings and cable coatings. Rock shield pads made of non-woven mats consisting of small diameter (approximately 1.25 mm) strands of flexible PVC are suitable for pipeline protection and commercially available e.g. from Sika Greenstreak Group, Inc. under the tradename TUFF-N-NUFF®.

While the existing products show satisfactory properties, reduction of material consumption and costs is always a task, in particular when considering mass products. A reduction of the product weight would allow easier installation and less $CO_2$ emission during transport. Of course, improvements in this regard by altering the product composition or structure should not significantly deteriorate the desired properties and the appearance of the existing products.

Different approaches are possible to reduce material costs or reduce product weight, such as making the product thinner or the use of alternative raw materials. However, these approaches often sacrifice on deteriorated impact properties or a different appearance of the product.

EP 2612881 A1 relates to a resin composition for preparing foamed rigid polymer products, comprising at least one polymer resin which may be polyvinyl chloride, a surface-treated calcium carbonate, and a blowing agent.

US 2012/208963 A1 describes foamable halogenated polymers such as polyvinyl chloride comprising a specific multi-stage emulsion processing aid polymer.

EP 1065242 A1 is concerned with an expandable vinyl chloride resin composition comprising 100 parts by weight of a vinyl chloride resin, 5 to 30 parts by weight of a (meth)acrylic ester polymer, as a processing aid, and 2 to 25 parts by weight of a thermally decomposable inorganic foaming agent.

WO 02/20660 A2 relates to polyvinyl chloride resin compositions for increasing the degree of whiteness in finished polyvinyl chloride foams, the resin compositions containing sulfur compounds.

SUMMARY OF THE INVENTION

The object of the invention was to provide a replacement material for unfoamed flexible PVC products, in particular rock shield pads, enabling to reduce material consumption and costs while at least keeping product properties of the existing product, especially impact properties and appearance. Moreover, the product weight should be reduced for the sake of easier installation and less $CO_2$ emission during transport. In addition, it should be possible to reduce the amount of plasticizer contained in unfoamed PVC products such as rock shield pads in order to achieve the required flexibility.

Surprisingly, the object could be solved by foam extrusion of a dry blend of a PVC-p formulation containing a nucleating agent, preferably talcum, and a chemical blowing agent, in particular sodium bicarbonate, in certain proportions.

Accordingly, the invention relates to a plasticized PVC formulation for foam extrusion comprising polyvinyl chloride, at least one plasticizer, at least one nucleating agent, preferably talcum, and a chemical blowing agent, in particular sodium bicarbonate, wherein the plasticized PVC formulation is a dry blend containing 0.5 to 5% by weight of the at least one nucleating agent, preferably talcum, and 0.1 to 3% by weight of the chemical blowing agent.

When comparing an article based on conventional unfoamed plasticized PVC, namely a rock shield pad, with a corresponding article based on the foamed plasticized PVC obtainable by foam extruding the plasticized PVC formulation of the invention, the following was determined:
a) The same optical product properties are provided, i.e. the appearance remains the same.
b) Due to foaming additional softening is imparted. Therefore, the plasticizer amount in the formulation for foaming can be reduced compared to the corresponding unfoamed formulation in order to achieve the same flexibility.
c) Rock drop resistance properties are maintained or even slightly improved by the foamed product. It is assumed that improved impact properties of the foamed product are caused by cushioning effects and/or improved energy absorption.

In summary, it is possible to prepare an article based on the foamed PVC-p of the invention using approximately the same dimensions as in a corresponding article based on unfoamed PVC-p which nevertheless has the same appearance and the same or even improved mechanical properties. It is clear that the foam structure entails reduction of material consumption and product weight compared to the unfoamed solid product saving costs and reducing environmental burden.

The invention is also related to a foam extrusion method using the inventive plasticized PVC formulation, a foamed plasticized PVC article obtained by said method, and the use of said foamed plasticized PVC article as described in the further independent claims. Preferred embodiments of the invention are recited in the dependent claims.

DETAILED DESCRIPTION OF THE INVENTION

Figure 1:
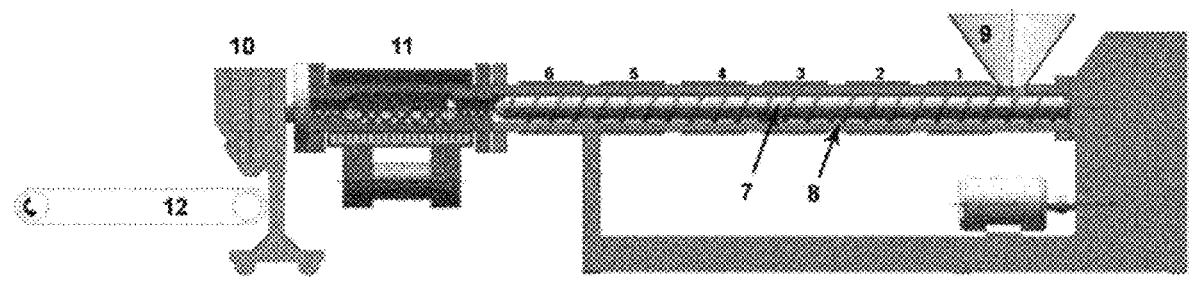
FIG. 1 shows an extrusion plant suitable for the method of the invention.

Throughout the description and the claims, indications of weight percentages (% by weight) are based on the total weight of the plasticized PVC formulation unless specified otherwise.

Plasticized PVC Formulation

The plasticized PVC formulation comprises polyvinyl chloride. Any common commercially available polyvinyl chloride can be used. PVC is also designated polyvinyl chloride resin. PVC or PVC resin is generally supplied in powder form. Such PVC powder is suitable.

The K value of the PVC is preferably in the range of from 65 to 75, more preferably 67 to 73 and in particular 69 to 71. The K value of PVC is a measure for the molecular weight of PVC and can be determined according to DIN 53726.

The amount of PVC in the plasticized PVC formulation may vary in wide ranges but is is preferably from 20 to 70% by weight, more preferably from 30 to 60% by weight and still more preferably from 40 to 51% by weight.

The plasticized PVC formulation further comprises at least one plasticizer. A variety of plasticizers are used to produce flexible PVC. The skilled person is familiar with the compounds suitable as plasticizer in PVC which are also compiled in numerous plastics handbooks. Any conventional plasticizer can be used. It is possible to use one plasticizer or a mixture of two or more plasticizers. Mixtures of plasticizers are often used to obtain desired properties.

Examples of plasticizers are phthalic acid diesters (also known as "phthalates") such as dialkyl phthalates, such as di-$C_6$-$C_{13}$-alkyl phthalates, and alkyl benzyl phthalates, dialkyl terephthalates, epoxides, aliphatic carboxylic diesters, polyester-type polymers, adipic polyesters, phosphate esters, such as triaryl and alkylaryl phosphates, trimellitate esters, benzoate and dibenzoate esters, citrate esters and alkyl sulphonic esters of phenol and mixtures thereof.

Specific examples of plasticizers are dibutyl phthalate (DBP), diisobutyl phalate (DIBP), di-isononyl phthalate (DINP), diallyl phthalate (DAP), di-2-ethylhexyl-phthalate (DEHP or DOP), diisodecyl phthalate (DIDP), di(2-propyl heptyl) phthalate (DPHP), di-2-ethylhexyl adipate (DOA), di(tridecyl)phthalate (DTDP), butyl benzyl phthalate (BBP), dihexyl phthalate, tri-2-ethyl hexyl trimellitate (TOTM), condensation products of glycols such as 1,3 buylene glycol with dibasic organic acids such as adipic acid, dipropylene glycol dibenzoate and mixtures thereof.

The amount of plasticizers in the plasticized PVC formulation may vary in wide ranges but is is preferably from 15 to 45% by weight, more preferably from 20 to 40% by weight and still more preferably from 26 to 31% by weight.

The plasticized PVC formulation further contains 0.5 to 5% by weight of at least one nucleating agent, preferably talcum. The amount of the at least one nucleating agent, preferably talcum, in the plasticized PVC formulation is preferably from 0.5 to 3% by weight, more preferably from 0.7 to 2% by weight, and still more preferably from 1 to 2% by weight.

Nucleating agents are substances which when added to polymers support generation of crystallization seeds in the polymer melt thus supporting formation of an increased number of crystals and accelerating crystallization process. The skilled person in this technical field is familiar with the use of nucleation agents. The plasticized PVC formulation may contain one or more nucleating agents.

Examples for the at least one nucleating agent are sheet silicates, fumed silica, carbon black, graphite, titanium dioxide, citric acid, quartz powder, talcum or a mixture of at least two of these nucleating agents. The nucleating agent is preferably talcum.

Talcum is also called talc. Talcum is usually added as talcum powder. Talcum powder is commercially available in different grades which are suitable for the invention. The cell structure of the foam can be adjusted by the average particle size of the talcum used. Talcum with lower particle size results in a foam with smaller cells and higher cell density which is usually preferred. The median particle size of the talcum is preferably not more than 20 microns, more preferably not more than 10 microns.

In this application median particle size refers to weight average particle size determined by sedimentation analysis, Stoke's law, according to ISO 13317-3.

The plasticized PVC formulation further contains 0.1 to 3% by weight of chemical blowing agent, preferably sodium bicarbonate. The amount of the chemical blowing agent, in particular sodium bicarbonate, in the plasticized PVC formulation is preferably from 0.3 to 1% by weight, more preferably from 0.4 to 0.7% by weight. A chemical blowing agent generates gas by a chemical reaction, e.g. decomposition, which is induced e.g. by temperature increase.

Examples of suitable chemical blowing agents are azodicarbonamide, azobisisobutyronitrile, benzenesulphonyl hydrazide, 4,4-oxybenzenesulphonyl semicarbazide, 4,4-oxybis(benzenesulphonyl hydrazide), diphenyl sulphone-3, 3-disulphonyl hydrazide, p-toluenesulphonyl semicarbazide, sodium bicarbonate, ammonium carbonate, ammonium bicarbonate, potassium bicarbonate, diazoaminobenzene, diazoaminotoluene, hydrazodicarbonamide, diazoisobutyronitrile, barium azodicarboxylate and 5-hydroxytetrazole, wherein sodium bicarbonate is preferred.

Sodium bicarbonate, also called baking soda, is most preferred as blowing agent. It exhibits the best results and is very environmental-friendly, and not toxic. Sodium bicarbonate is generally used in form of a powder. All commercially available grades are suitable.

It is preferred to use a chemical blowing agent, in particular sodium bicarbonate, with a narrow particle size distribution to control the decomposition temperature. Thus, decomposition during dry blending can be avoided. Broader particle size distribution works as well but the foam structure is impaired. The median particle size of the chemical blowing agent, in particular sodium bicarbonate, may be e.g in the range of 1 to 50 microns, preferably 2 to 30 microns and more preferably 2 to 10 microns.

Usually lower particle sizes of the blowing agent are preferred with respect to quality of foam structure and entire decomposition of the blowing agent but a too low particle size may result in premature decomposition in the dry blending process. In order to use blowing agents with lower particle size it is possible to use a dry blend of the formulation without the blowing agent and to add the blowing agent separately by an additional dosing unit for the blowing agent at the extruder.

Best results are obtained when about 0.4 to 0.7% by weight sodium bicarbonate is used. However, higher amounts of sodium bicarbonate are possible, which generally result in reduced foam density.

It is preferred that only sodium bicarbonate is used and no additional chemical blowing agent is contained in the PVC-p formulation for nucleation.

In a preferred embodiment, the plasticized PVC formulation further comprises high molecular weight acrylic polymer as foaming aid. Acrylic polymer is a polymer or copolymer of acrylic monomers such as methyl (meth)acrylate, ethyl (meth)acrylate and butyl (meth)acrylate where (meth)acrylate means acrylate or methacrylate. The high molecular weight acrylic polymer is preferably high molecular weight PMMA. PMMA is the common abbreviation for polymethyl methacrylate. The high molecular weight acrylic polymer, in particular PMMA, is preferably used in form of a powder as is commercially available. It is preferred that the acrylic polymer has a narrow molecular weight distribution.

The high molecular weight acrylic polymer, preferably PMMA, preferably has a weight average molecular weight ($M_w$) of at least 500'000, more preferably at least 1'500'000, still more preferably at least 4'000'000, as determined by gel permeation chromatography (GPC), preferably using polystyrene as a standard.

The plasticized PVC formulation may be free of high molecular weight acrylic polymer or may contain it. The amount of high molecular weight acrylic polymer, in particular high molecular weight PMMA, in the plasticized PVC formulation is preferably not more than 9% by weight, more preferably not more than 3% by weight, still more preferably not more than 2% by weight. In a particular preferred embodiment, the plasticized PVC formulation contains not more than 1.2% by weight high molecular weight acrylic polymer, in particular high molecular weight PMMA.

If high molecular weight acrylic polymer, in particular high molecular weight PMMA, is included in the plasticized PVC formulation, the amount of high molecular weight acrylic polymer, in particular PMMA, is preferably at least 0.1% by weight, more preferably at least 0.3% by weight.

High molecular weight acrylic polymer serves as a foaming aid to get improved melt strength. In contrast to standard PVC foam extrusion, a much lower high molecular weight acrylic polymer level is necessary to get the desired melt strength. It is also possible that the plasticized PVC formulation is free of high molecular weight acrylic polymer.

The plasticized PVC formulation may optionally comprises at least one filler. It is usually preferred that at least one filler is incorporated in the plasticized PVC formulation. Any filler conventional in the field of PVC compounding can be used. It is possible to use one filler or a mixture of two or more fillers. In the present invention, talcum is not considered as a filler, also with respect to the suitable amounts of filler indicated below.

The filler is usually an inorganic particulate solid. Examples of suitable fillers are calcium carbonate, diatomaceous earths, mica, and calcined clays and mixtures thereof, where calcium carbonate is preferred. Any grades of dry-ground, wetground, or precipitated calcium carbonate may be used. The calcium carbonate may be e.g. limestone, marble, calcite or chalk. Chalk is most preferred. The filler may be surface treated, e.g. by hydrophobic treatment.

The amount of filler in the plasticized PVC formulation may vary in wide ranges but is is preferably from 5 to 45% by weight, more preferably from 10 to 30% by weight and still more preferably from 15 to 25% by weight, in particular 18 to 22% by weight The plasticized PVC formulation may further comprises at least one stabilizer. Stabilizers are usually added into such formulations. It is possible to use one stabilizer or a mixture of two or more stabilizers. The use of stabilizers is conventional in the field of PVC compounding. The main purpose of stabilizers in flexible PVC compositions is to prevent degradation during processing and forming into finished shapes. Most stabilizers are metal compounds such as calcium compounds, tin compounds, zinc compounds and mixed metal compounds. A number of lead compounds and cadmium compounds are also suitable but the use thereof is decreasing or stopped due to environmental and health concerns.

Examples of suitable stabilizers are metal salts of carboxylic acids, especially fatty acids such as stearate, palmitates and laureates ("metallic soaps"), e.g. calcium stearate, organotin compounds, and mixed metal carboxylates, such as systems based on barium, zinc and calcium carboxylates, in particular Ba—Zn carboxylates and Ca—Zn carboxylates, for instance a mixture of barium and zinc stearate or a mixture of calcium stearate and zinc stearate. Mixed metal stabilizers are often used together with co-stabilisers.

The amount of stabilizer in the plasticized PVC formulation may vary in wide ranges but is is preferably from 0.5 to 5% by weight, more preferably from 1 to 3% by weight and still more preferably from 1.5 to 2.5% by weight.

The plasticized PVC formulation may optionally comprise further additives which are conventional in the field of PVC compounding. Such further additives are e.g. lubricants, coloring agents, such as pigments, fire retardants, co-stabilisers, anti-microbials, UV-screeners, acid scavengers, and antistatic agents.

In a preferred embodiment, the plasticized PVC formulation, comprises a) 20 to 70% by weight, preferably 30 to 60% by weight, of polyvinyl chloride, b) 0.5 to 5% by weight, preferably 1 to 3% by weight, of one or more stabilizers, c) 0 to 9% by weight, preferably 0.1 to 9% by weight, more preferably 0.3 to 3% by weight, of high molecular weight acrylic polymer, in particular high molecular weight PMMA, d) 15 to 45% by weight, preferably 20 to 40% by weight, of one or more plasticizers, e) 5 to 45% by weight, preferably 10 to 30% by weight, of one or more fillers, f) 0.5 to 5% by weight, preferably 0.5 to 3% by weight, of one or more nucleating agents, in particular talcum, and g) 0.1 to 3% by weight, preferably 0.3 to 1% by weight, of chemical blowing agent, in particular sodium bicarbonate.

In a still more preferred embodiment, the plasticized PVC formulation, comprises a) 40 to 51% by weight of polyvinyl chloride, b) 1.5 to 2.5% by weight of one or more stabilizers, c) 0.3 to 2% by weight of high molecular weight acrylic polymer, in particular PMMA, d) 26 to 35% by weight of one or more plasticizers, e) 15 to 25% by weight of one or more fillers, f) 0.5 to 2% by weight of one or more nucleating agents, in particular talcum, and g) 0.3 to 1% by weight, preferably 0.4 to 0.7% by weight, of chemical blowing agent, in particular sodium bicarbonate.

Dry Blend

The components of the plasticized PVC formulation are mixed or fused to obtain a dry blend. The dry blend is usually in form of a powder. Dry blending is conventionally carried out in a dry blender. Dry blends are common in the field of PVC compounding. In the typical dry blending process, the PVC resin particles intermingle with all the other additives to produce the final homogenously mixed material. Mixture or fusion in dry blends is accomplished by a combination of stress and temperature.

For instance, in an exemplary dry blending process PVC powder, stabilizer, and foaming aid are added to a dry blender and heated, e.g. to approx. 80-90° C., then the plasticizer is added and further heated, e.g. to 100-110° C. Then filler, nucleating agent, in particular talcum, and blowing agent such as sodium bicarbonate are added together and mixed for a short time, e.g. 2-3 min, while cooling the compound. Alternatively, the chemical blowing agent such as sodium bicarbonate can be added separately at the end of the process in a separate cooling mixer or by a separate dosing unit directly into the extruder.

Extrusion Process

The dry blend can be used to prepare a foamed plasticized PVC article. The method comprises the step of foam extruding the dry blend of the plasticized PVC formulation by an extrusion plant with an extruder and a die. The extrusion process as such is well known to the skilled person.

The extrusion plant may be a conventional device used in the field of PVC extrusion e.g. comprising an extruder with a barrel and a screw unit contained in the barrel or a ram and a die. The extruder may be conventional extruder, e.g. a ram extruder and a screw extruder such as a single screw extruder or a twin screw extruder. A single screw extruder is preferred. The extruder preferably has a high L/D ratio, wherein L is the screw length and D is the screw diameter. The ratio L/D of the extruder may be e.g. at least 25, preferably at least 30 and more preferably at least 35.

The extruder barrel has a feed port where the material to be extruded enters the extruder and an outlet port where the material leaves the barrel. The outlet port is coupled with the die via a gate or adapter piece. A static melt blender may be interposed between the barrel and the die.

Upstream means the direction to the feed port and downstream means the direction to the outlet port. The feed port is generally connected with a hopper to which the material to be extruded is added. It is preferred that a screen pack and breaker plate are positioned at the end of the barrel to avoid plugging in the nozzles.

The extruder barrel comprises at least a plastication and compression zone and a metering zone downstream of the plastication and compression zone. In the plastication and compression zone at the end of the feed port the material is fed and major part of PVC is melted and compressed. In the metering zone the melt is homogenized and metered or pumped out the outlet port.

The extruder further generally comprises heating elements, cooling elements, temperature sensors and temperature control elements to provide temperature control zones along the barrel which are designated barrel zones. The extruder may comprise e.g. 3 to 8 barrel zones, preferably at least 5 barrel zones, by which a temperature profile can be realized in the barrel.

FIG. 1 shows an extrusion plant suitable for the method of the invention, where the extruder comprises a screw 7 contained in a barrel 8 and a hopper 9. The barrel comprises six barrel zones 1-6 for temperature control. The plastication and compression zone of the barrel is approximately in barrel zones 1 and 2 for plastication and in barrel zones 3 and 4 for compression and decomposition of blowing agent. The metering or cooling zone of the barrel is approximately in barrel zones 5 and 6. The die 10 is connected to the extruder via an optional static melt blender 11. In FIG. 1 the die is rotated by 90° to feed the extruded strands to a conveyor belt 12 on which the strands can be laid to form a non-woven mat. It is, of course, not necessary to rotate the die. The arrangement depends on the further processing.

There exist a number of temperature profiles used in extrusion such as e.g. an increasing temperature profile where the temperature increases downstream the barrel, a decreasing temperature profile where the temperature decreases downstream the barrel, and a humped temperature profile where the temperature increases from the feed port toward a certain set point, e.g. toward approximately the middle of the barrel, and then decreases toward the outlet port. In the method of the invention a humped temperature profile is preferably used.

The foam extrusion of the inventive method is preferably operated with a temperature profile of the barrel where the maximum temperature is in a section of the plastication and compression zone. The temperature downstream of said section, in particular the temperature in the metering zone is lower. Said maximum temperature is preferably at least 5° C. higher, more preferably at least 10° C. higher, still more preferably at least 15° C. higher, than the minimum temperature in the metering zone.

The maximum temperature in said section of the plastication and compression zone is preferably in the range of 185° C. to 215° C., more preferably 190 to 210° C.

The barrel length refers to the distance from the downstream edge of the feed port (0% of the barrel length) to the outlet port of the barrel (100% of the barrel length). The section of the plastication and compression zone with the maximum temperature is preferably located within the region of 0 to 70%, more preferably 0 to 60%, and still more preferably 0 to 50%, of the barrel length. Usually the temperature in at least a region of 0 to 10%, preferably 0 to 20%, of the barrel length is also lower the maximum temperature and may be, e.g. in the range of 145° C. to 165° in order to avoid a premature decomposition of the blowing agent and gas loss via the funnel.

For foam extrusion the dry blend of the invention is fed to the extruder, usually via a hopper out of full extruder throat. As described above and in contrast to standard PVC extrusion, the extruder temperature profile of the barrel is different in that an increased temperature or maximum temperature is set in a section where plastication and pressure build up and then activation and decomposition of baking soda occurs. Approximately in the second half of the extruder, in particular in the metering zone, lower temperatures are set in order to decrease melt temperature again. This is important to get sufficient melt strength which promotes successful foam extrusion.

The temperature of the last barrel zone, i.e. the barrel zone at the outlet port, may be for instance in the range of 160° C. to 190° C., preferably 165° C. to 185° C. The temperature also depends from the preferred requirement of the maximum temperature discussed above.

As mentioned a static melt blender may be interposed between the extruder barrel and the die. In this optional embodiment the static melt blender between extruder and the die can be used to homogenize the melt temperature and composition still further. The static melt blender may have a length of 4-8D, preferably 6D, most preferably 8D, where D refers to the outer diameter of the melt blender. The static melt blender is optionally provided with integrated cooling. The temperature in the static melt blender may be set e.g. at the same temperature as the temperature in the barrel zone at the outlet port or the gate or slightly lower.

The melt produced in the extruder is then transported to the die, optionally via the static melt blender. Die temperatures can be e.g. similar or slightly higher than the temperature in the barrel zone at the outlet port or the gate. The temperature of the die may be for instance in the range of 160° C. to 205° C., preferably 165° C. to 200° C. Die temperatures at the higher end of said range promotes the required adhesion between the strands, whereas die temperatures at the lower end improves the foam structure. Also the die may be divided in two or more temperature control zones designated as die zones.

The die may contain one or more nozzles having a nozzle inlet and a nozzle outlet or nozzle lip, respectively. The lip is also called land. In a preferred die design the die structure is basically like a coat hanger die as known from membrane extrusion or film extrusion, which however divides before die exit into a plurality of single strands each leading to a nozzle such as orifice nozzle.

The die preferably contains a perforated plate with a plurality of orifice nozzles. The perforated plate may contain more than 100, preferably more than 250 and still more preferably more than 500 orifice nozzles.

A high compression ratio at the nozzle outlet is preferred, e.g. a compression ratio of >5:1, preferably >10:1. Compression ratio means the ratio of the cross section area of the nozzle inlet to the cross section area of the nozzle outlet or nozzle lip (land). Cross section refers to the cross section in transverse direction to the flow direction in the nozzle. The cross section areas of nozzle inlet and nozzle outlet or lip (land) may have any conventional shape. The shape of the nozzle outlet or lip depends on the desired profile of the extruded article. The cross section areas of nozzle inlet and/or nozzle outlet or nozzle lip are preferably circular.

In order to increase the compression ratio it is generally preferred to increase the diameter of the nozzle inlet while maintaining the diameter of the nozzle outlet or lip constant in order to maintain the appearance of the extruded strands.

High compression ratio and a nozzle lip length as short as possible favor foaming, i.e. high expansion, and a homogenous and fine cell structure. However, this also results in high strand swelling after nozzle exit. The effect is the more pronounced the higher the acrylic polymer content. Accordingly, when a high acrylics proportion in the formulation is used, the compression ratio should be decreased and the nozzle lip length (land length) should be increased.

The polymer melt is pumped through the die and formed into a shape. This shape can be any shape, e.g. a strand or a plurality of strands, profile, plate, film, tube, or have any other shape. Extrusion of a plurality of strands ("spaghetti-type strands") is preferred.

The extruded product is usually cooled immediately after leaving the die. A water spray or water bath right after the die helps to faster cool down the extruded product and thus stabilizes the foam. However, too much cooling hinders proper fusion of the strands. Water spray cooling is preferred.

Product Properties

The method of the invention produces a foamed plasticized PVC article. The article may be a strand or a plurality of strands ("spaghetti-type strands"), profile, plate, film or a tube. A subsequent treatment of the semi-finished material made is possible. For instance, the plurality of strands extruded composed of foamed PVC-p may be converted into a non-woven mat by conventional means which is suitable as a rock shield pad. The strands may be continuously extruded onto the conveyor and cooled. Subsequently, the pad can be cut as needed and the articles obtained may be stacked or rolled according to the dimension.

The optical product properties or appearance of the foamed plasticized PVC article is the same as that of a corresponding unfoamed plasticized PVC article. Softening due to foaming allows reduced plasticizer content in the formulation of the foamed article compared to the unfoamed article.

The foamed plasticized PVC has preferably a foam density ranging from 0.88 to 0.96 g/cm³, more preferably from 0.88 to 0.92 g/cm³. The foamed plasticized PVC has a cell structure of closed cells, wherein the cell diameter is preferably in the range of 20 to 200 micron, more preferably from 20-100 microns, most preferably from 50 to 80 microns.

The impact resistance or rock drop properties of the foamed plasticized PVC article which is a rock shield pad for pipeline protection are maintained or even slightly improved compared to a corresponding article made of unfoamed PVC-p. The rock drop properties are determined according to the methods set forth in ASTM G13-89, Standard Test Method for Impact Resistance of Pipeline Coatings (Limestone Drop Test) where the test method is modified to better comply with rock shields. No holidays at 4 inch rocks, few or no holidays at 6 inch rocks were observed.

The foamed plasticized PVC article is suitable for rock shield pads, roofing and waterproofing membranes, waterstops and waterbars, pipes and hosepipes, joint sealings and cable coatings. The foamed plasticized PVC article is particularly suitable for rock shield pads which are non-woven mats composed of foamed plasticized PVC strands. The rock shield pad is used in particular as a pipeline protection.

EXAMPLES

A formulation was prepared with the components and proportions thereof indicated in the following table, wherein DPHP is di(2-propyl heptyl) phthalate and DOA is di-2-ethylhexyl adipate.

| # | Components | | Amount [% by weight] |
|---|---|---|---|
| 1 | PVC | PVC powder, K value 70 | 44.5 |
| 2 | Stabilizer | | 2 |
| 3 | Foaming aid | high molecular weight PMMA, $M_w$ 4-5 · $10^6$ | 1 |
| 4 | Plasticizer | DPHP and DOA | 31 |
| 5 | Filler | chalk | 20 |
| 6 | Nucleating agent | talcum | 1 |
| 7 | Blowing agent | sodium bicarbonate | 0.5 |

The components were mixed in a dry blending process, wherein components 1-3 were added to the dry blender and heated to approximately 80-90° C.: Then component 4 is added and further heated to 100-110° C. Subsequently, components 5-7 were added together and mixed for 2-3 min while cooling the compound. Optionally, component 7 can be added at the end separately in a separate cooling mixer.

The dry blend obtained was foam extruded in an extruder according to FIG. 1 with an L/D ratio of 30. The following temperature profile in the extruder was used were the indicated barrel zones correspond to those of FIG. 1.

| | |
|---|---|
| Barrel zone 1 | 150° C. |
| Barrel zone 2 | 195° C. |
| Barrel zone 3 | 200° C. |
| Barrel zone 4 | 190° C. |
| Barrel zone 5 | 175° C. |
| Barrel zone 6 | 175° C. |
| Gate | 160° C. (alternatively 175° C.) |

Figure 2:
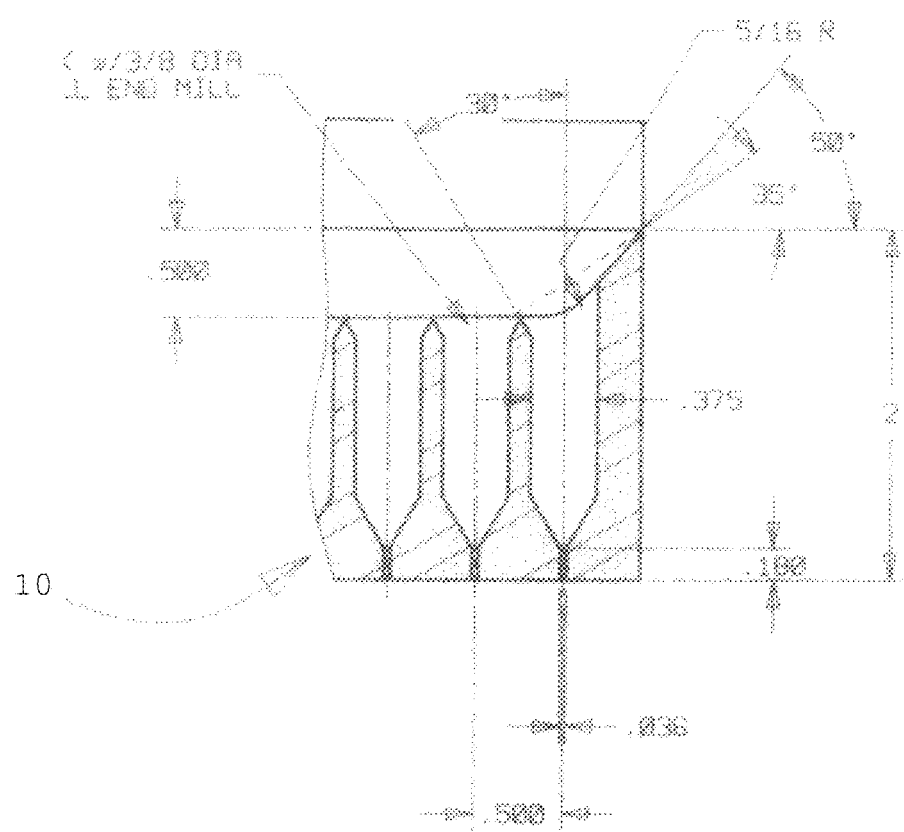
FIG. 2 shows a partial cross section through orifice nozzles of a die suitable for the method of the invention. The dimensions indicated are given in inches.

A partial cross section of the orifice nozzles is shown in FIG. 2. The die includes a perforated plate with 626 orifice nozzles having an outlet diameter of 0.036 inch and an inlet diameter of 0.375 inch. The lip length (land length) of the orifice nozzles was 0.180 inch. The compression ratio of inlet to orifice was >10:1.

The nozzles are arranged in rows in transversal direction extending over the whole range of the pad to be prepared on the conveyor belt. The die is divided in die zones in this direction from right to left with the following temperature profile. The temperature profile is used to compensate differences in the flow resulting in differences in mass distribution.

| | |
|---|---|
| Die zone 1 (right) | 190° C. |
| Die zone 2 | 185° C. |
| Die zone 3 | 180° C. |
| Die zone 4 | 175° C. |
| Die zone 5 (center) | 180° C. |
| Die zone 6 | 175° C. |
| Die zone 7 | 180° C. |
| Die zone 8 | 185° C. |
| Die zone 9 (left) | 190° C. |

The extruded foam has a closed cell structure. The cell size was approx. 50-80 microns. Foam density was about 0.88-0.92 g/cm$^3$.

The extruded foamed PVC-p strands were used to form a non-woven mat or pad. The non-woven mat was compared with a non-woven mat formed from extruded unfoamed PVC-p strands obtained by a similar PVC-p formulation having a higher plasticizer content.

The optical product properties (appearance) of the foamed strands and the unfoamed strands were the same. The flexibility of the strands was also approximately the same, although the formulation for the foam extrusion included a lower plasticizer content.

The impact properties of the non-woven mat composed of the extruded foamed PVC-p strands prepared were tested by rock drop test according to modified ASTM G13 (Standard Test Method for Impact Resistance of Pipeline Coatings (Limestone Drop Test)). No holidays at 4 inch rocks, few or no holidays at 6 inch rocks were observed. An improvement of impact properties (rock drop properties) due to foaming/cushioning is recognisable compared to the non-woven mat composed of unfoamed strands.

REFERENCE LIST 1-6 barrel zones
7 screw
8 barrel
9 hopper
10 die
11 static melt blender
12 conveyor

The invention claimed is:

1. A non-woven mat that is suitable for use as a rockshield pad to protect a pipeline, the non-woven mat being formed from a plurality of foamed PVC strands that are fused together,
wherein each of the plurality of strands consists of a plasticized PVC formulation, and
the non-woven mat exhibits no holidays at 4 inch rocks when tested according to ASTM G13-89 as modified to accommodate the rockshield pad.

2. The non-woven mat according to claim 1, wherein the mat exhibits improved rock drop impact properties as compared to a like non-woven mat formed from a plurality of unfoamed PVC strands.

3. A method of protecting a pipeline, comprising arranging the non-woven mat according to claim 1 on the pipeline so that the pipeline is protected from rock impacts.

4. The non-woven mat according to claim 1, wherein the plasticized PVC formulation comprises from 40 to 51 percent by weight of PVC and from 26 to 31 percent by weight of plasticizer.

5. A non-woven mat comprising a plurality of foamed PVC strands that are fused together, wherein the foamed PVC strands include 30 to 60 percent by weight of PVC resin and 20 to 40 percent by weight of plasticizer and have a foam density in a range of from 0.88 to 0.96 g/cm$^3$.

6. The non-woven mat according to claim 5, wherein the foamed PVC strands have closed cells with a cell diameter in a range of from 20 to 200 microns.

7. The non-woven mat according to claim 5, wherein the foamed PVC strands have a foam density in a range of from 0.88 to 0.92 g/cm$^3$.

8. The non-woven mat according to claim 5, wherein the plasticizer includes a phthalate plasticizer.

9. The non-woven mat according to claim 5, wherein the foamed PVC strands include 5 to 45 percent by weight of a calcium carbonate filler.

10. The non-woven mat according to claim 5, wherein the foamed PVC strands include a fatty acid compound.

11. The non-woven mat according to claim 5, wherein the foamed PVC strands have a diameter of approximately 1.25 mm.

12. A method comprising:
(i) producing a plasticized PVC melt that comprises a PVC resin and a plasticizer;
(ii) foam extruding the plasticized PVC melt through a die into a plurality of extruded foamed strands, wherein the die includes a plurality of orifice nozzles, and a single one of the plurality of extruded foamed strands is extruded through each of the plurality of orifice nozzles; and
(iii) forming the extruded foamed strands into a non-woven mat in which the extruded foamed strands are fused together,
wherein the non-woven mat exhibits no holidays at 4 inch rocks when tested according to ASTM G13-89 as modified to accommodate a rockshield pad.

13. The method according to claim 12, wherein the extruded foamed strands consist of a plasticized PVC formulation from the plasticized PVC melt, and each strand has from 20 to 70 weight percent of the PVC resin and from 15 to 45 percent by weight of the plasticizer.

14. The method according to claim 12, wherein the die includes more than 500 orifice nozzles.

15. The method according to claim 12, wherein a compression ratio at a nozzle outlet of the die is greater than 10:1.

16. The method according to claim 12, wherein the plasticized PVC melt is produced in an extruder having a barrel and a screw contained in the barrel, and the plasticized PVC melt is conveyed to the die from an outlet of the barrel.

17. The method according to claim 16, wherein the method further employs a static melt blender that is interposed between the barrel and the die.

18. The method according to claim 16, wherein the barrel comprises a plastication and compression zone in which a major part of the PVC resin is melted and compressed, and the plastication and compression zone is located within a region of the barrel that extends from 0 to 70% of the barrel length in a direction extending from a downstream edge of a feed port of the barrel to the outlet of the barrel.

19. The method according to claim 18, wherein the plastication and compression zone is located within a region of the barrel that extends from 0 to 60% of the barrel length in the direction extending from the downstream edge of the feed port of the barrel to the outlet of the barrel.

20. The method according to claim 18, wherein the plastication and compression zone is located within a region of the barrel that extends from 0 to 50% of the barrel length in the direction extending from the downstream edge of the feed port of the barrel to the outlet of the barrel.

21. The method according to claim 18, wherein a maximum temperature of the barrel is located in the plastication and compression zone.

22. The method according to claim 21, wherein the maximum temperature is in a range of from 190° C. to 210° C.

23. The method according to claim 22, wherein a temperature in a region of the barrel that extends from 0 to 20% of the barrel length in the direction extending from the downstream edge of the feed port to the outlet of the barrel is in a range of from 145° C. to 165° C.

24. The method according to claim 21, wherein a temperature of a zone at the outlet of the barrel is in a range of from 165° C. to 185° C.

25. The method according to claim 16, wherein the extruder has a screw length L and a screw diameter D, and the ratio L/D is at least 25.

26. The method according to claim 12, wherein the plasticized PVC melt further comprises a nucleating agent and a blowing agent.

27. The method according to claim 12, wherein the plasticized PVC melt comprises, by weight, a) 30 to 60% of the PVC resin, b) 0.5 to 5% of one or more stabilizers, c) 20 to 40% of the plasticizer, d) 5 to 45% of filler, e) 0.5 to 5% of one or more nucleating agents, and f) 0.1 to 3% of a blowing agent.

28. A non-woven mat that is suitable for use as a rock-shield pad to protect a pipeline, the non-woven mat being formed from a plurality of foamed PVC strands that are fused together, wherein each of the plurality of strands consists of a plasticized PVC formulation, and the plasticized PVC formulation comprises from 30 to 60 percent by weight of PVC and from 20 to 40 percent by weight of plasticizer.

29. A method comprising:
(i) producing a plasticized PVC melt that comprises a PVC resin and a plasticizer;
(ii) foam extruding the plasticized PVC melt through a die into a plurality of extruded foamed strands, wherein the die includes a plurality of orifice nozzles, and a single one of the plurality of extruded foamed strands is extruded through each of the plurality of orifice nozzles; and
(iii) forming the extruded foamed strands into a non-woven mat in which the extruded foamed strands are fused together,
wherein the PVC resin has a K value in the range of from 69 to 71 as determined according to DIN 53726.

* * * * *